Dec. 20, 1955  V. H. FRAY  2,727,255
METHOD OF AND APPARATUS FOR FORMING AND THREADING
THE POINTS OF WOOD SCREWS AND THE LIKE
Filed Nov. 28, 1951  2 Sheets-Sheet 1
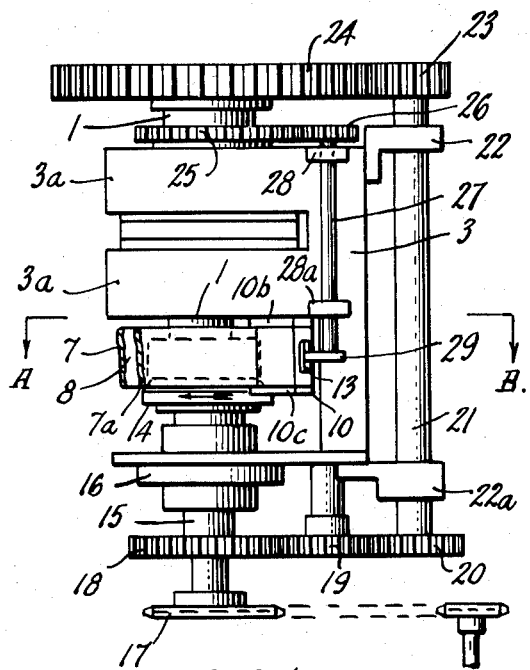
FIG. 1.
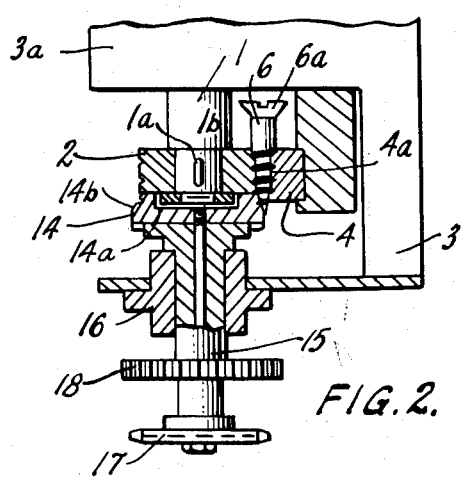
FIG. 2.
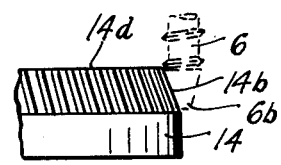
FIG. 3.
FIG. 4.
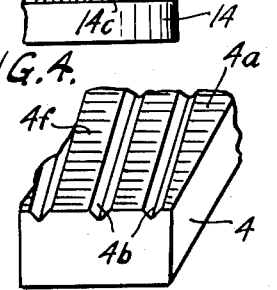
FIG. 5.
FIG. 6.
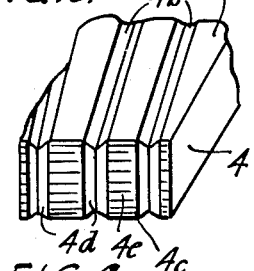
FIG. 7.
INVENTOR
Victor Hill Fray
BY Haseltine, Lake & Co.
AGENTS Dec. 20, 1955  V. H. FRAY  2,727,255
METHOD OF AND APPARATUS FOR FORMING AND THREADING
THE POINTS OF WOOD SCREWS AND THE LIKE
Filed Nov. 28, 1951  2 Sheets-Sheet 2

INVENTOR
VICTOR HILL FRAY
BY:
Haseltine, Lake & Co.
AGENTS

United States Patent Office 2,727,255
Patented Dec. 20, 1955

2,727,255

METHOD OF AND APPARATUS FOR FORMING AND THREADING THE POINTS OF WOOD SCREWS AND THE LIKE

Victor Hill Fray, Auckland, New Zealand

Application November 28, 1951, Serial No. 258,582

11 Claims. (Cl. 10—4)

This invention relates to the manufacture of wood screws and the like as distinguished from metal thread screws, bolts and the like, the objects of the present invention being the provision of a method of and apparatus for forming and threading the points of the wood screws and the like which will enable greater speed of production of such wood screws and the like.

At present, wood screws are manufactured by a thread or screw cutting operation as distinguished from a thread rolling operation, the difficulty presented in respect of wood screws being in that they taper away to a point and have to be threaded right to the point, the thread being of wide pitch and of different form to the screw threads as apply to bolts and the like.

The wood screws of standard form with single thread starts are therefore manufactured in machines which closely resemble screw cutting lathes, the screw blank being held in a rotating chuck with lathe tools effecting the screw cutting in the blank.

Such method of production is slow and is wasteful of material in that metal is cut away to waste.

It has also been known to roll thread the wood screws with however very indifferent results because of the necessity of pointing the blanks in a separate machine and even then the points are poor so that the screws produced are not looked upon with favour as not being in the same high class as the standard wood screws.

There are also roll threaded wood screws which have double or two start threads, but this type of screw has a very limited sale in the furniture trade and does not replace the standard wood screws.

It may therefore be said that it is known to apply the threads to wood screws by a thread rolling operation and to also apply the points to the screws by a thread rolling operation, but the screws produced are so much inferior to the standard machine cut wood screws as to be very limited in their use.

The fact is that the parallel portion of the wood screw can be satisfactorily produced by a thread rolling operation, but that such thread rolling operation is unsatisfactory in the production of a tapered point with in addition (as is required on wood screws) a thread on such tapered point.

My invention has accordingly been devised to overcome the difficulty in regard to the forming and threading of the points of wood screws and the like and to enable the production of wood screws up to the standard of those produced by the screw cutting machines but at a much greater speed of production.

The present invention in one form thereof may be said to comprise a method of forming and threading the points of wood screws comprising the planetary travel of screws through planetary or rotary thread rolling apparatus with the shank ends of the screws projecting past the thread roller and threaded segment thereof, bringing said projecting shank ends of the screws into contact with a rotating hob during such planetary travel and cutting the points and forming the threads on such shank ends in passage past the hob by the cutting edges formed on such hob.

Further, the invention may also be said to comprise a method of forming and threading the points of wood screws comprising the planetary travel of wood screw blanks through planetary or rotary thread rolling apparatus with the shank ends of the blanks projecting past the thread roller and threaded segment thereof, rolling the thread on such blanks by contact with the thread roller and threaded segment, effecting longitudinal travel of the blanks in addition to their planetary travel, bringing the projecting shank ends of the blanks into contact with a rotating hob during such planetary travel and cutting the points and forming the threads on such shank ends in passage past the hob by the cutting edges formed on such hob.

The apparatus for use in the improved methods of forming and threading the points of wood screws and the like comprises a planetary type thread rolling machine having a thread roller and a stationary threaded segment, hob means having an angular forming or cutter face and disposed directly against the thread roller eccentrically in relation to the latter and drive means to such hob means which are fixed in relationship to the drive means of the thread roller.

In describing the invention reference will be made to the accompanying drawings in which:

Figure 1 shows a side elevation of the apparatus from the feed-in side thereof,

Figure 2 is a sectional elevation of the lower portion of the apparatus,

Figure 8:
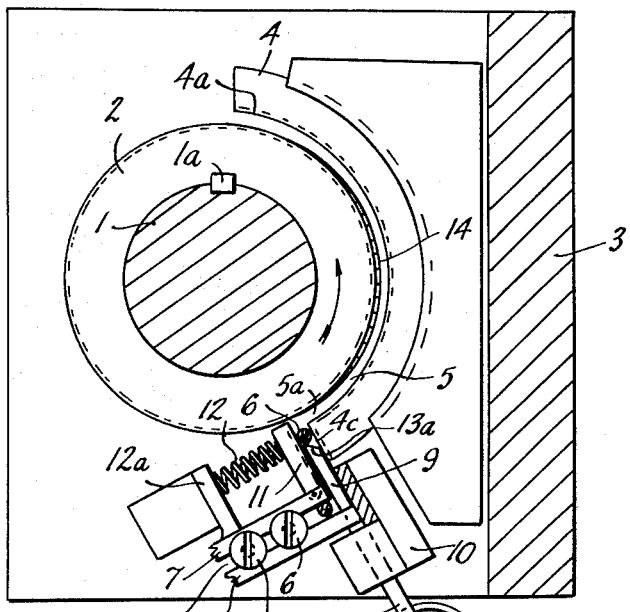
Figures 9, 10:
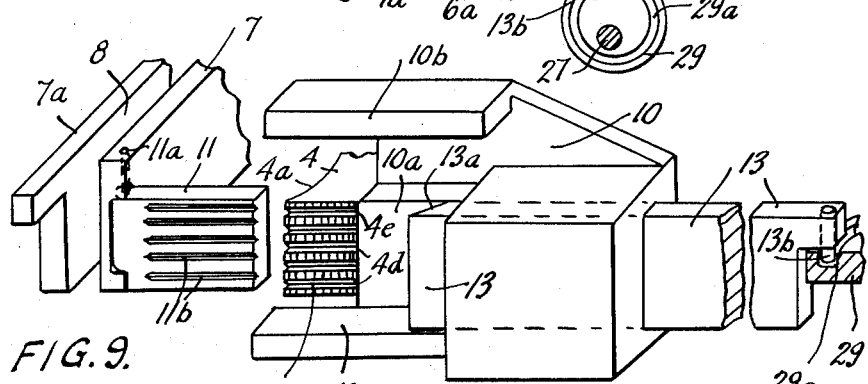
Figure 11:
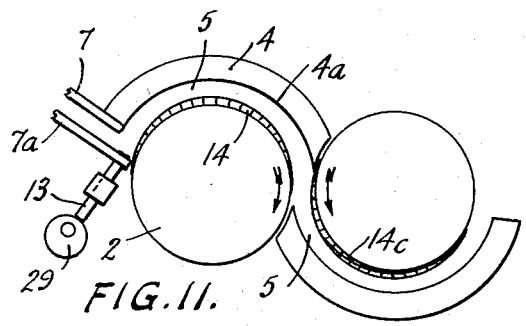

Figure 3 shows a partial side elevation of a pointing hob excluding the threading helixes, Figure 4 shows a partial side elevation of a pointing hob including threading helixes, Figure 5 is a perspective view from the feed-in end of a rough surfaced stationary segment, Figure 6 is a perspective view from the feed-in end of a smooth surface stationary segment but with a rough surfaced end face, Figure 7 is a partial side elevation of a thread roller provided with roughened surface, Figure 8 is an enlarged sectional plan view on line A—B of Fig. 1, Figure 9 is an enlarged perspective view of the hinged plate at the end of a chute bar, Figure 10 is an enlarged perspective view of the screw guide means and the pecker associated therewith and Figure 11 shows a diagrammatic plan view of a combination of two machines adapted to effect the production of wood screws in two combined operations.

In the invention, the thread rolling apparatus is of planetary or rotary roller type of the present known form having a vertical spindle 1 with a thread roller 2 rigidly secured thereto and mounted in bearings 3a extending from a main frame 3, the thread roller 2 being disposed closely adjacent to the curved face 4a of a stationary segment 4 which is adjustably and slightly eccentrically mounted to the main frame 3 to leave a gap 5 between the roller 2 and the segment 4, the curved face 4a of the latter having forming threads 4b which are complementary to the forming threads 2a in the periphery of the thread roller 2 (see Figs. 5, 6 and 7) the spindle 1 of the thread roller 2 extending upward therefrom with the latter secured as by a key 1a and a nut 1b to the bottom of the spindle 1 to present a minimum of projection below the thread roller 2 and leave a clear space for the introduction of further apparatus.

At the feed-in end of the gap 5 (see Fig. 8) mechanism is applied for conveying the screws or screw blanks 6 to the feed-in end 5a and for pushing the blanks into said gap at the correct intervals when a thread start of the roller 2 coincides with the thread start of the segment 4, this mechanism comprising a pair of rigid chute bars 7 and 7a with a vertical gap 8 between, the heads 6a of the screws or screw blanks 6 slidably resting on the top edges of the chute bars 7 and 7a with their shank portions hanging down within the vertical gap 8.

Such chute bars 7 and 7a lead from any known feeding means to the outer end of a passage 9 (see Fig. 8) which at its inner end is connected with the free-in end 5a of the gap 5, a guide block 10 being disposed at one side of the passage 9 while a hinged plate 11 is at the opposite side of the passage 9, this hinged plate 11 (see Fig. 9) being secured by a pivot pin 11a to the end of the chute bar 7, a compression spring 12 carried by a supporting bracket 12a pressing against the free end of the plate 11 so as to yieldingly force same towards the gap 5.

In the hinged plate 11 at the side thereof which forms a side of the passage 9, horizontal grooves 11b are cut, these being spaced apart so as to agree with the pitch of the thread of the screws 6.

The other side of this passage 9 is formed firstly by a face 10a of the guide block 10 and then the end face 4c of the segment 4 which is in line with the face 10a, such block 10 slidably carrying the pecker 13 which is disposed in line with the passage 9 and has a wedge shaped or angular inner end 13a, the guide block 10 including parallel upper and lower guide bars 10b and 10c, with the bar 10b extending along above the passage 9, the guide bar 10c extending along under the passage, the guide bar 10b having been cut away in Fig. 8 so as to enable the passage 9 under same to be clearly seen.

The end face 4c at the feed-in end of the segment 4 has horizontal grooves 4d cut therein (see Figs. 6 and 10) these grooves 4d leading to the forming threads 4b; the face 4c also being knurled, serrated or otherwise roughened 4e, the grooves 4d being spaced apart at intervals which agree with the pitch of the thread of the screw 6.

The top edges of the chute bars 7 and 7a are at a level which is higher than the level of the tops of the thread roller 2 and segment 4 so that a screw or screw blank 6 on entry to the gap 5 as guided by being disposed between the upper and lower guide bars 10b and 10c, has its head 6a some distance above the said roller 2 and segment 4 as shown in Fig. 2, wood screws not requiring to be threaded right up to the head and while the tops of the thread roller 2 and segment 4 are level with each other, it is preferred that the segment 4 have slightly greater depth than that of the roller 2 for backing purposes.

A hob form of milling cutter 14 is disposed directly below the bottom of the thread roller 2, being rigidly secured on to the top of a spindle 15 which is mounted in a suitable bearing 16 which is adjustably mounted to the lower portion of the frame 3, this hob 14 having a flat top in which there is a recess 14a so that it can contact or substantially contact the bottom of the thread roller 2 and being eccentrically located in relation to said thread roller 2, the latter and the hob 14 having their respective spindles 1 and 15 both truly parallel with each other, but with the hob spindle 15 nearer to the threaded segment 4.

At the periphery of the hob 14 near the top thereof there is a forming or cutter surface 14b of angular form, the angle being complementary to the angle to be formed on the point of a screw on screw blank 6 and formed in this forming or cutter surface 14b of the hob 14 there are helixes 14c, these being complementary to the thread to be formed on the point of the screw or screw blank 6.

Due to the eccentric disposal of the hob 14 in relation to the thread roller 2, a portion of the periphery of the hob 14 projects nearer to the threaded surface 4a of the segment 4 than does the periphery of the roller 2, this resulting in the periphery of the hob 14 projecting partly across and below the gap 5 so that the smaller diametered edge 14d of the hob 14 is brought to a position which substantially coincides with the periphery of the thread roller 2, this being at the position of closest approach of the hob 14 to the segment 4 which is substantially at the centre of the length of the latter.

Suitable power drive means are applied to the thread roller spindle 1 and the hob spindle 15 so that the thread roller 2 and the hob 14 have rotation of fixed relationship, the drive means being such as a chain drive sprocket 17 mounted on the bottom of the hob spindle 15 receiving power drive from an electric motor or other suitable power drive means, a gear wheel 18 secured to the hob spindle 15 being in mesh with an idler gear 19 which in turn is in mesh with a gear wheel 20 at the bottom end of a countershaft 21 supported in bearings 22 and 22a which are rigidly secured to extend from the frame 3, the top end of this countershaft 21 having a pinion 23 secured thereto which is in mesh with a gear wheel 24 secured to the top end of the thread roller spindle 1.

Also mounted on the thread roller spindle 1 there is a gear wheel 25 which meshes with a pinion 26 which is secured on the top end of a pecker drive shaft 27, this latter being supported in suitable bearings 28 and 28a which are secured to extend from the frame 3, a suitable cam 29 at the lower end of the shaft 27 engaging the outer end of the pecker 13, said pecker 13 having a pin 13b projecting therefrom into a groove 29a formed in the cam 29 (see Figs. 8 and 10) so that rotation of the latter imparts reciprocating motion to the pecker 13 whereby its angular inner end 13a travels between the end of the chute bars 7 and 7a and the gap 5 along the passage 9, the thickness of the portion of pecker 13 which is projected into the passage 9 being thinner than the width of passage required in permitting passage of a screw or screw blank 6 along same.

This pecker 13 may also be actuated through advancing and retarding mechanism or phase shifting mechanism such as described in my previous U. S. A. patent application Serial No. 147,066 of March 1, 1950, now Patent No. 2,662,430 issued December 15, 1953.

The surface of the thread roller 2 other than in its forming threads 2a is knurled, serrated or roughened 2b (see Fig. 7) the curved face 4a of the stationary segment 4 also being roughened or serrated 4f other than in its forming threads 4b (see Fig. 5) these roughened surfaces being applied when so required for the purposes hereinafter referred to.

In the manufacture of wood screws it is to be understood that conditions vary appreciably, there being not only short fine gauged screws as against long heavy gauged screws, but also comparatively soft materials to work as against hard materials, such as mild steel as compared with stainless steel and therefore while the machine so far described is consistently satisfactory when working on the lighter gauges of screw and on material of average hardness or toughness, the loading conditions can become too heavy on the heavier gauges of screw and when made of the harder materials and therefore the speed of the operation has to be appreciably reduced.

It is also to be understood that screws can be produced which are quite satisfactory for rough type of work, but that it is also necessary to produce screws which are up to the present recognised standard and therefore if the screws to be manufactured are to be up to this high standard, it is preferable that the threads be applied and the points cut in two stages, this involving two machines as described with slight modifications thereto affecting the thread roller 2, the stationary segment 4 and the hob 14.

As the primary object of this invention is to form and thread the points of wood screws, it may be said that it is incidental that the apparatus of the present invention can also apply the main portion of thread to the shanks of the screws at the same time as the points of the screws are being formed and threaded, this application of the main portion of thread to the blank by a thread rolling operation being known.

Accordingly, it being known to apply the main portion of thread to the shank of a screw by a thread rolling operation in known machines, the apparatus of the present invention could be used for only the purpose of forming and threading the points of wood screws, these screws having previously been thread rolled in any known manner in any known machine, with their point ends left blunt.

While it is not essential, it is nevertheless preferable that while the thread rolling operation is being effected on the screws, the shank ends thereof be also tapered to a point as a preliminary to the second stage of operation of finally shaping the point and applying a thread thereto in continuation of the rolled main portion of thread.

If therefore the machine is only required to apply the points and form the threads on the points of screws which have previously been roll threaded up to a blunt point, the roughened surface 2b on the roller 2 and roughened surface 4f on the segment 4 is not necessary.

If two machines are to be used, the first machine will be as described with the thread roller 2 having serrations 2b and the stationary segment 4 also having serrations 4f, but the hob 14 will be as shown in Fig. 3, such hob 14 excluding the helixes 14c so that a plain angular cutter surface 14b is presented which will cut a blunt tapered point 6b on the blank 6 as shown dotted in Fig. 3.

The second machine will have its thread roller 2 smooth surfaced by excluding the serrations 2b and its stationary segment 4 also smooth surfaced by excluding the serrations 4f (see Fig. 6) but its hob 14 will include the helixes 14c.

The two separate machines as described are preferred in that in view of different machining operations performed, the speed of operation of the first machine can be appreciably higher than that of the second machine, there having to be fixed relationship between the speed of rotation of the hob 14 and the speed of rotation of the thread roller 2 in the threading of the point in the second machine by the helixes 14c of the hob 14.

For such reasons of speed of operation, the combination of two machines into one as diagrammatically indicated in Fig. 11 would mean that its speed of production would have to be limited to that of the second machine in such combination, in which the rollers 2, segments 4 and hobs 14 would be so disposed as to join up the gaps 5 to present a single path for the screws, passage through which would effect the complete two stage treatment.

The thread roller 2 will have a considerable number of "thread starts" as is known in thread rolling apparatus of the planetary type whereby several screw or screw blanks 6 are within the gap 5 at the one time, these being preferably spaced apart at distances which are equal to every two thread starts of the roller 2 so that there is ample clearance between the heads 6a of the screws 6 in passage along the gap 5.

In addition, the threads of the roller 2 and segment 4 are slightly changed as to their helix angles so as to produce a small degree of longitudinal travel of the screws 6 in addition to effecting their planetary travel along the gap 5, this longitudinal travel being in the direction which will cause the shank ends of the screws 6 to move towards the hob 14, the roller 2 having a slightly steeper angle of thread helix as compared with that of the segment 4 (or vice versa) and the total angle between these being equal to double the pitch angle of the screw thread.

This longitudinal travel or "feed down" is only a small amount, all that is necessary being a distance equal to half of the pitch of the thread being applied to the screws 6, the reason for this longitudinal travel of the screws being to avoid a junction mark between the thread as produced by the thread rolling operation and the thread on the point as produced by the hobbing operation.

In respect of the hob 14, this will preferably have two helixes 14c or in other words will have two thread starts which would obviously be diametrically opposite to each other and the gearing or drive between the hob 14 and the thread roller 2 will be such that for each half revolution of the hob 14 (equal to one thread start) the screw 6 would revolve a distance equal to one pitch between the roller 2 and segment 4, this being substantially equal to one revolution during its planetary travel.

In use or operation, and considering the production of the screws 6 wherein their shanks are roll threaded and their points formed and threaded in a single operation in one machine, the screw blanks travel along the chute bars 7 and 7a with their heads 6a resting on the top edges of such chute bars, the level of which is above the level of the tops of the roller 2 and segment 4, it not being necessary to screw wood screws right up to their heads.

On having been projected at a slight angle in relation to the axis of the roller 2 into the gap 5 between the roller 2 and the segment 4 by the pecker 13 and the hinged plate 11, at the correct time when every second start of the roller 2 coincides with the thread start at the entry end of the segment 4, the screw blank 6 commences its planetary travel with a portion of the shank end thereof projecting to below the level of the roller 2, the thread on the screw blank 6 commencing to be roll threaded and such screw 6 becoming securely gripped against slip between the roller 2 and the segment 4 because of the serrations 2b and 4f respectively formed in these.

The screw blank 6 is entered to the gap 5 at a slight angle to allow for the angles applied to the forming threads of the roller 2 and the segment 4 whereby the longitudinal travel of the screw is produced.

In continuing its planetary travel along the gap 5, the downwardly projecting shank end of the screw comes into contact with the hob 14 which is rotating in opposite direction to that of the roller 2 (as indicated by the arrow in Fig. 1) the extent of this contact gradually being increased because of the eccentric disposal of the hob 14 in relation to the roller 2 and the nearer approach of the periphery of the hob 14 to the segment 4, this projecting shank end which receives some support or backing by the increased depth of the segment 4 below the roller 2, having a milling or hobbing operation performed thereon whereby it is tapered to a point by the forming or cutter surface 14b to also leave a thread because of the helixes 14c in such surface 14b, such thread on the screw point being a continuation of the thread on the major portion of the screw as formed by the thread rolling operation between the roller 2 and segment 4.

As has been previously mentioned, the forming threads of the roller 2 and the segment 4 are slightly changed as to the helix angles thereof and therefore while the screw 6 is effecting its planetary travel along the gap 5, it is also effecting some small amount of longitudinal travel in downward direction whereby its projection towards the hob 14 increases, this resulting in a portion of the thread which has been formed by the thread rolling operation to have been also projected into contact with the hob 14 and thus said hob effects its operation on such projected threaded portion of the screw to join up the rolled and hobbed portions of thread without there being any junction mark between these, the maximum depth of cut taken by the hob 14 being taken at a position substantially at the centre of the length of the gap 5 at which point the thread rolling operation has proceeded to substantially the maximum extent, the completed screw 6 being discharged from the delivery end of the gap 5.

Now as has been mentioned, the sizes of screws vary appreciably and they are also made of materials some of which can be said to be easy to work and some hard and therefore while the machining operation described will consistently produce satisfactory screws under good conditions, these in appearance are somewhat rougher than the present general standard of screws, in the general comparison as applies to any roll threaded screw as against a screw cut or machine cut screw wherein metal is cut away to waste, the roughness also being caused by the marks caused in obtaining the necessary secure grip on the screws while effecting their planetary travel, the serrations in the roller 2 and segment 4 imparting marks to the bottoms of the screw threads.

Accordingly, if the manufacturer desires to produce the screws all of the general high standard, it is necessary to effect the operation in two steps or stages in two machines, these two stages reducing the loading of the machines by effecting the full operation in two easier stages.

The first machine therefore has, as has been described, a roller 2 and segment 4 both of which are provided with the serrations 2b and 4f respectively, but the hob 14 has a plain cutter surface 14b without any helixes 14c formed therein and in addition, there is no necessity for rotation of the hob 14 to have fixed relationship to that of the roller 2 so that its speed of rotation can be varied to that most suitable.

It is also not necessary to have longitudinal or downward travel of the screw in its planetary travel along the gap 5 and it is also preferred that the thread roller 2 and the segment 4 have slightly greater depth than the roller and segment of the second machine, so that extra length of rolled thread will be formed on the screw in its passage through the first machine, for reasons to be mentioned.

In passage through this first machine the thread is rolled although not necessarily to the full depth as required and while such thread is being formed, the rotating hob 14 cuts a taper to a blunt point 6b on the shank end of the screw 6 as shown in Fig. 3, this blunt point 6b being such as will leave ample metal for subsequent treatment.

Having passed through the first machine, the screw 6 having the thread and blunt point 6b applied thereto is ready to pass into the second machine as has been described, this machine having a smooth surfaced roller 2 and a smooth surfaced segment 4, the hob 14 of the second machine including the helixes 14c therein.

It is to be understood that on being fed into the gap 5 of this second machine, the screws 6 now have threads formed on same and are not plain surfaced as in the case of the blanks which were entered to the first machine and therefore in passing these threaded screws into the second machine, such threads of the screws must register with the forming threads of the roller and segment 4 of such second machine.

Actually with threads already formed on the screws whether as formed by the first machine as described or by any other known thread rolling machine and not necessarily having the tapered blunt points 6b (although preferable) the screws 6 present substantiallly little resistance to being projected into the gap 5 of the second machine, but nevertheless it is important that on entry of these threaded screws to the gap 5, the threads of the screws truly engage with the forming threads 2a and 4b of the roller 2 and segment 4 respectively.

On a threaded screw entering the passage 9 from the vertical gap 8 between the chute bars 7 and 7a, its length is such that the head 6a thereof passes under the upper guide bar 10b while the shank end bears on the lower guide bar 10c with slight clearance for vertical movement and on such screw 6 being pushed along the passage 9 by the angular end 13a of the pecker 13 bearing against the shank thereof, this angular end of the pecker 13 induces a rotating motion of the screw 6 which action is further assisted by the roughened surface 4e of the end face 4c of the segment 4 and the pressure of the hinged plate 11 as applied to the shank of the screw, this rotation of the screw causing its thread to engage within the grooves 4d and 11b of the segment 4 and hinged plate 11 respectively at opposite sides of the passage 9, this engagement causing the hinged plate 11 to be moved by the spring 12 to nearer the segment 4 a distance equal to about twice the depth of the thread of the screw 6, the latter then ceasing to rotate and being correctly held for entry to the gap 5, such entry taking place when the screw 6 reaches the gap 5 to be pushed thereinto by the hinged plate 11 and the angular end 13a of the pecker 13.

To further assist this entry of the screws 6 to the gap 5 of the second machine with the screw threads truly engaged with the forming threads of the roller 2 and segment 4, these latter are made somewhat shallower in depth than those of the first machine in which extra length of thread has been formed on the screws, the reason for this being to ensure that on passage into the gap 5 of the second machine, there will be some spare length of thread on the screws 6 at the head ends thereof so that the roller 2 and segment 4 of the second machine will not come into contact with an unthreaded portion of the screw.

Obviously, the screws as entered to the second machine will be at a level which is such that extra threads of the screw 6 will be above the top level of the roller 2 and segment 4, so that during the planetary travel along the gap 5 the screw can also effect its longitudinal travel without extra length of thread having to be rolled in the vicinity of the head of the screw, and also such that there is the correct amount of projection of the shank ends of the screws for proper contact and required depth of cutting by the hob 14.

In the planetary travel of the screw through the second machine, the major portion of operation effected therein is by the hob 14 which includes the helixes 14c, this forming the tapered thread on the blunt point 6a joined up with the previously formed thread and in addition, the rolled thread is produced to the full required depth, the smooth surfaced roller 2 and segment 4 ironing out or smoothing the marks which have been formed at the bottoms of the threads by the serrations in the roller and segment of the first machine.

With the screws already threaded and passed to the machine for forming the points and applying the threads thereto, the longitudinal travel of the screws would not be essential, in that the shank ends by being already threaded would enable the point with thread to correctly join up with same.

Obviously if the machine is to have unthreaded screw blanks passed therethrough, the provision of the grooves 4d and 11b in the segment 4 and hinged plate 11 are not necessary, but are no objection.

I claim:

1. Apparatus for use in forming and threading the points of wood screws and the like comprising a planetary type thread rolling apparatus having a thread roller and a stationary threaded segment, drive means for said thread roller, a hob having an angular forming or cutting face at an angle complementary to the angle to be formed on the point of the screw and disposed directly against the thread roller eccentrically in relation to the latter, at least one helix on the cutting face complementary to the thread to be formed on the point of the screw, and drive means for said hob, the hob being driven faster than and oppositely to said thread roller.

2. Apparatus for use in forming and threading the points of wood screws and the like comprising a thread rolling machine having a vertical spindle rotatably mounted in bearings extending from a main frame, a thread roller secured at the bottom end of said spindle and closely adjacent to the curved face of a stationary segment secured to the main frame to leave a gap between the roller and the segment, means at the feed-in end of the gap for conveying the screws thereto and for pushing them into the gap, a hob with angular cutter surface and with helixes formed in such cutter surface disposed directly below the bottom of the thread roller and secured on top of a vertical spindle which is rotatably mounted in a bearing secured to the lower portion of the main frame, a power drive, and transmission means from the power drive to the hob spindle and to the thread roller spindle determining a fixed ratio of the speeds thereof.

3. The method of threading the shank and cutting and threading the point of a wood screw or the like in a single operation, comprising, the steps of rolling a thread onto the shank of a screw blank, moving the screw blank progressively in a longitudinal direction toward its tip during the thread rolling operation, and simultaneously cutting and threading a pointed tip on the screw blank, the longitudinal movement of the blank and the cutting and threading of the tip being correlated so as to form a continuous unbroken thread from the shank to the tip of the screw blank.

4. The method of threading the shank and cutting and threading the point of a wood screw or the like in a single operation, comprising, the steps of rolling a thread onto the shank of a screw blank, moving the screw blank progressively in a longitudinal direction toward its tip during the thread rolling operation, and simultaneously pointing the tip and progressively cutting a thread thereon as an uninterrupted continuation of the rolled thread.

5. In combination, a screw tip cutting and threading means and a shank threading means adapted to cut and thread the point, and thread the shank, respectively, of a wood screw or the like, said screw tip cutting and threading means being located closely adjacent the shank threading means, means for operating said screw tip cutting and threading means in fixed relationship with the shank threading means, said shank threading means constituting means to move a screw blank which is tilted at an angle to the path of movement of the blank longitudinally toward its tip so as to contact the screw tip cutting and threading means, whereby a screw blank can be pointed and the shank of said screw blank threaded to its tip with an uninterrupted thread in a single operation.

6. The combination as called for in claim 5 wherein said shank threading means is a thread rolling means having an operational movement in a direction opposite to and in a plane parallel with the screw tip cutting and threading means.

7. Apparatus for threading the shank and cutting and threading the point of a wood screw or the like comprising, a thread roller and a stationary threaded element of arcuate shape mounted adjacent the periphery of the roller so as to leave a gap through which a screw blank may be caused to travel; and a screw tip cutting and threading means adapted to cut and thread the point of such screw blank and located closely adjacent to and moving in a plane parallel with the plane of operation of said thread roller, said thread roller constituting means to move said screw blank which is tilted at an angle to the path of movement of the blank longitudinally toward its tip so as to contact a surface of the tip cutting and threading means, said surface having helices formed therein, whereby a screw blank can be provided with an uninterrupted continuous thread extending along its shank and to the pointed tip of the screw in a single operation.

8. Apparatus as called for in claim 7 wherein said screw tip cutting and threading means during its operation moves in a direction opposite to that of the thread roller.

9. Apparatus as called for in claim 8 wherein said screw tip cutting and threading means is a hob form of milling cutter.

10. Apparatus for threading the shank and cutting and threading the point of a wood screw or the like comprising, a thread rolling means consisting of a rotary thread roller and a stationary threaded element of arcuate shape mounted adjacent the periphery of the roller so as to leave a gap through which a screw blank may be caused to travel; and a cutting and threading means adapted to cut and thread the point of such screw blank, located immediately adjacent to and mounted to operate in a plane parallel to the plane of rotation of said thread roller; said thread roller being of uniform diameter and said cutting and threading means having a tapered cutter surface, said surface having helices formed therein of a pitch angle comparable to the effective pitch angle of the thread rolling means; said thread rolling means constituting means to move a screw blank which is tilted at an angle to the path of movement of the blank longitudinally toward its tip during the travel along the gap between said thread roller and said stationary threaded element so that the tip of the screw blank contacts the tapered cutter surface of said cutting and threading means; said last named means being indexed with said thread roller, and means for maintaining the movement of said last named means in predetermined relationship with the rotation of said thread roller, whereby a screw blank can be provided with an uninterrupted continuous thread extending along its shank and to the tip of the screw in a single operation.

11. Apparatus for threading the shank and cutting and threading the point of a wood screw or the like comprising, a thread rolling means consisting of a rotary thread roller and a stationary threaded element of arcuate shape mounted adjacent the periphery of the roller so as to leave a gap through which a screw blank may be caused to travel; and a hob form of milling cutter adapted to cut and thread the point of such screw blank, located immeediately adjacent to and mounted to rotate in a plane parallel to the plane of rotation of said thread roller; said thread roller being of uniform diameter and said hob cutter having a tapered cutter surface, the smallest diameter of the hob cutter being equal to the diameter of the thread roller at the location at which the two are immediately adjacent; said hob cutter having helices formed in its surface of a pitch angle comparable to the effective pitch angle of the thread rolling means; said thread rolling means constituting means to move a screw blank which is tilted at an angle to the path of movement of the blank longitudinally toward its tip during the travel along the gap between said thread roller and said stationary threaded element so that the tip of the screw blank contacts the tapered cutter surface of said hob cutter; said hob cutter being indexed with the thread roller, and means for maintaining the rotation of said hob cutter in predetermined relationship with the rotation of said thread roller, whereby a screw blank can be provided with an uninterrupted continuous thread extending along its shank and to the tip of the screw in a single operation.

References Cited in the file of this patent

UNITED STATES PATENTS

| | | |
|---|---|---|
| 223,730 | Harvey | Jan. 20, 1880 |
| 1,920,600 | Simkins et al. | Aug. 1, 1933 |
| 2,197,732 | Olson | Apr. 16, 1940 |